US011792093B2

(12) United States Patent
Nechushtan et al.

(10) Patent No.: US 11,792,093 B2
(45) Date of Patent: Oct. 17, 2023

(54) GENERATING NETWORK SYSTEM MAPS BASED ON NETWORK TRAFFIC

(71) Applicant: FORESCOUT TECHNOLOGIES, INC., San Jose, CA (US)

(72) Inventors: Oren Nechushtan, Ramat-Gan (IL); Oded Comay, Tel Aviv (IL)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/384,458

(22) Filed: Jul. 23, 2021

(65) Prior Publication Data
US 2023/0006899 A1    Jan. 5, 2023

Related U.S. Application Data

(60) Provisional application No. 63/217,027, filed on Jun. 30, 2021.

(51) Int. Cl.
*G06F 15/173* (2006.01)
*H04L 43/045* (2022.01)

(52) U.S. Cl.
CPC ................................. *H04L 43/045* (2013.01)

(58) Field of Classification Search
CPC .................................................... H04L 43/045
See application file for complete search history.

(56) References Cited

U.S. PATENT DOCUMENTS

| | | | |
|---|---|---|---|
| 10,848,402 B1* | 11/2020 | Haddow | H04L 43/0888 |
| 2011/0239273 A1* | 9/2011 | Yang | H04L 43/028 |
| | | | 709/224 |
| 2016/0087860 A1* | 3/2016 | Dixon | H04L 45/02 |
| | | | 370/252 |
| 2018/0139104 A1 | 5/2018 | Seddigh et al. | |
| 2018/0176252 A1 | 6/2018 | Nimmagadda et al. | |

OTHER PUBLICATIONS

International Search Report and Written Opinion of the International Searching Authority for International Application No. PCT/US2022/031656, dated Sep. 19, 2022.

* cited by examiner

*Primary Examiner* — Padma Mundur
(74) *Attorney, Agent, or Firm* — Womble Bond Dickinson (US) LLP

(57) ABSTRACT

Systems, methods, and related technologies for generating a network system map based on network traffic and possibly additional data are described. Network traffic may be received and parsed to obtain metadata associated with the network traffic. A network system may be identified based on the metadata. A network system map may be generated for the network system based on one or more of the metadata or the additional data.

20 Claims, 8 Drawing Sheets

GENERATING NETWORK SYSTEM MAPS BASED ON NETWORK TRAFFIC

RELATED APPLICATIONS

This application claims priority to U.S. Provisional Patent Application No. 63/217,027, filed Jun. 30, 2021, which is incorporated herein by reference.

TECHNICAL FIELD

Aspects and implementations of the present disclosure relate to network monitoring, and more specifically, generating network system maps based on network traffic.

BACKGROUND

As technology advances, the number and variety of devices that are connected or coupled to communications networks are rapidly increasing. Each device may have its own respective vulnerabilities which may leave the network open to compromise or other risks. Preventing the spreading of an infection of a device or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
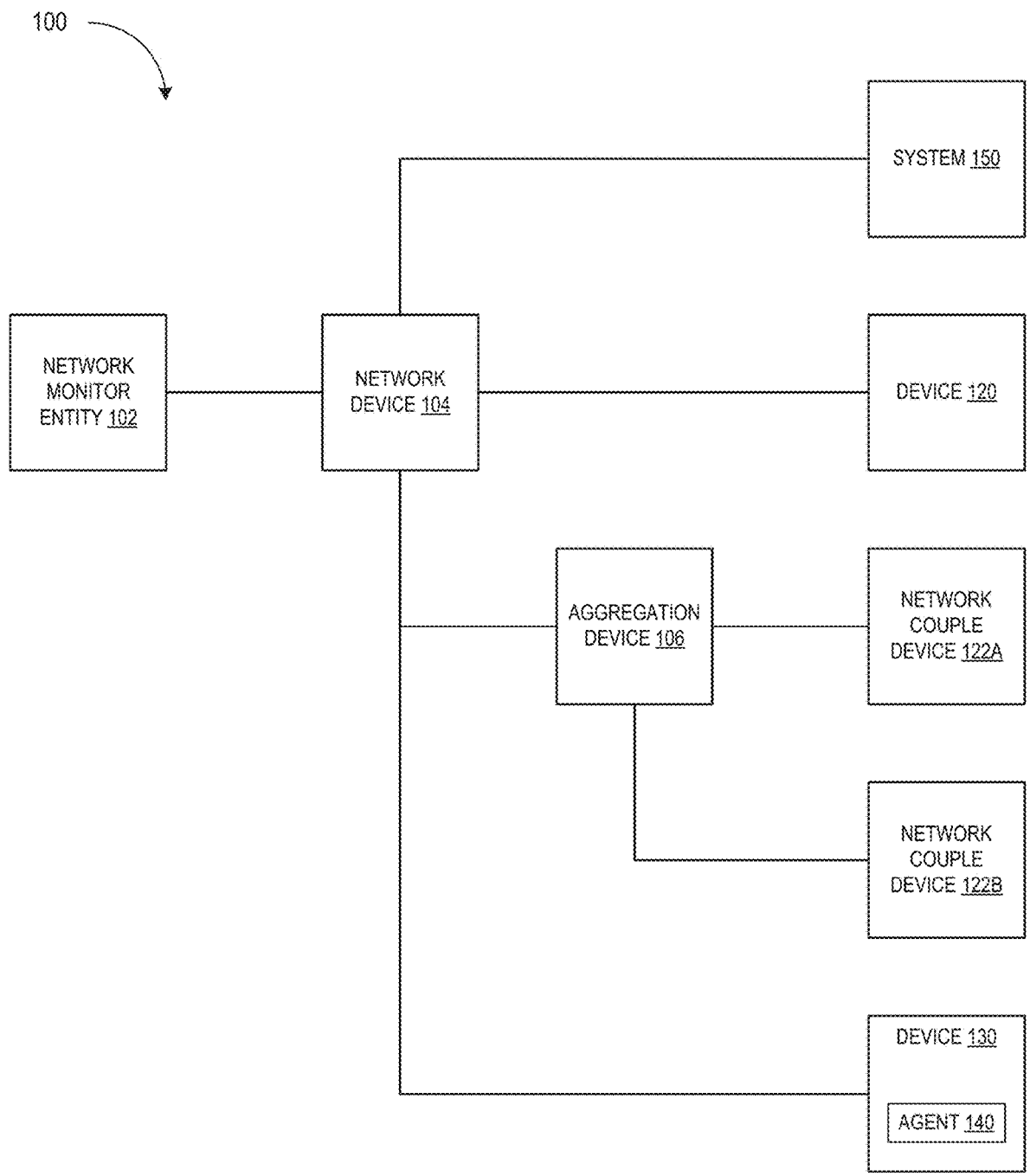
FIG. 1 depicts an illustrative communication network in accordance with one implementation of the present disclosure.

Aspects and implementations of the present disclosure are directed to generating network system maps for network systems based on one or more of metadata and additional data. The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras (IP cameras), wearable devices, medical devices, etc.) can make it difficult to effectively ensure that network security is maintained. Classification can be particularly important for securing a network because lack of knowledge about what a device is can prevent application of appropriate security measures. In addition, performing various actions, such a security actions, may also help maintain network security. Classifying devices and performing actions to maintain network security is often based on the network traffic (e.g., packets, messages, frames, etc.) transmitted by the devices. In addition, classifying network systems (e.g., a set of network devices that may perform or provide one or more network based functionalities) may also help maintain network security. Accordingly, described herein in various implementations are systems, methods, techniques, and related technologies, which allow for improved processing, which may include parsing, of network traffic and generating network system maps of different network systems.

Accordingly, described herein in various implementations are systems, methods, techniques, and related technologies, which enable a system mapping component (e.g., a mapper, a system mapper, etc.) to parse network traffic and generate a network system map more quickly, efficiently, or a combination thereof. The system mapping component may parse the network traffic to obtain metadata of the network traffic. Based on the metadata, the system mapping component may identify one or more network systems and may generate one or more network system maps for the one or more network systems. Each network system map may indicate the devices that are part of the respective network system. Each network system map may also indicate how the different devices of the respective network system are coupled to each other. This may allow users to more easily or more quickly identify different network systems and the devices that are part of the network systems.

The system mapping component may identify the network systems and generate the network system maps without initially performing deep packet inspection of the network traffic. For example, the system mapping component may identify the network systems and generate the network system maps based on headers (e.g., a portion of a packet or message that is before the payload of the message or packet) or footers (e.g., a portion of a packet or message that is after the payload of the message or packet) of the network traffic, or based on the protocol used by the network traffic. In another example, the system mapping component may identify the network systems and generate the network system maps without analyzing or processing the payloads of the network traffic. This allows the system mapping component to identify network systems and generate network system maps even when the payload of the network traffic is encrypted or otherwise unreadable.

Previous identification or classification approaches have had several problems. Previous identification approaches would identify individual devices in a network. However, these previous identification approaches would not identify a network system that provides a network based functionality for users or other devices. In addition, the previous identification approaches would not identify which devices were part of a network system (e.g., the devices that operate together in the network system). This makes it more difficult for users to identify different network systems in their network and to identify which devices are part of which network system.

In some embodiments, the system mapping component may allow network systems to be identified based on metadata associated with the network traffic. By not performing a deep packet inspection initially, the system mapping component may use fewer resources (e.g., computing resources, memory resources, etc.) of a network monitor entity. This may also reduce the cost of operation for the network monitor entity. For example, using less processing power may allow the network monitor entity to consume less power. The system mapping component may also be able to operate on other network monitor entities that have less processing capabilities.

In one embodiment, the system mapping component may also be able identify network systems and generate network system maps more quickly. For example, rather than parsing the payloads in network traffic (which would take a longer amount of time), the system mapping component may focus on the metadata (e.g., that is obtained based on analyzing headers and footers of the network traffic, sizes of the network traffic, when network traffic was transmitted or received, etc.) which may allow the system mapping component to generate the network system maps more quickly, efficiently, etc.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Network segmentation can be used to enforce security policies on a network, for instance in large and medium organizations, by restricting portions or areas of a network which a device can access or communicate with. Segmentation or "zoning" can provide effective controls to limit movement across the network (e.g., by a hacker or malicious software). Enforcement points including firewalls, routers, switches, cloud infrastructure, other network devices, etc., may be used to enforce segmentation on a network (and different address subnets may be used for each segment). Enforcement points may enforce segmentation by filtering or dropping packets according to the network segmentation policies/rules. The viability of a network segmentation project depends on the quality of visibility the organization has into its devices and the amount of work or labor involved in configuring network devices.

An entity or entities, as discussed herein, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the device, a device may have an IP address (e.g., a device) or may be without an IP address (e.g., a serverless service). Embodiments are able to dynamically (e.g., on the fly or responsive to changing conditions, for instance, a device being communicatively coupled to a network or in response to determination of characteristics of a device) control access of various entities or micro-segment various entities, as described herein.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the device and one or more other entities communicatively coupled to a network. Access rules may control whether a device can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network.

FIG. 1 depicts an illustrative communication network 100, in accordance with one implementation of the present disclosure. The communication network 100 includes a network monitor entity 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor entity 102, devices 120 and 130, and network coupled devices 122a-b. Network device 104 may be one or more network switches, access points, routers, firewalls, hubs, etc.

Network monitor entity 102 may be operable for a variety of tasks including generating system maps for network systems in a network, as described herein. Network monitor entity 102 can generate these system maps based on metadata associated with or obtained from network traffic. In some embodiments, network monitor entity 102 can use local resources (e.g., processing, memory, data resources, or other resources), cloud resources, or a combination thereof for generating these network maps. In various embodiments, various libraries may be used to generate these system maps, as discussed in more detail below.

Network monitor entity 102 may also use additional data or other types of data to update the system maps. For example, after an initial system map is generated based on the metadata, the network monitor entity 102 may update the initial system map based on user input, packet analysis (e.g., an analysis of the payload of the network traffic or packets), etc.

Network monitor entity 102 can determine one or more enforcement points where the device is communicatively coupled to the network and thereby determine the one or more enforcement points closest to the device. For example, network monitor entity 102 may access information on a switch (e.g., a switch cache) to determine a port (e.g., physical port, wireless port, or virtual port) where a device with a particular IP address or MAC address or other identifier is communicatively coupled. Network monitor entity 102 may also access information from a wireless access point where the device is communicatively coupled. In some embodiments, network monitor entity 102 may poll information from a cloud service to determine where a device is communicatively coupled or connected to a network. In various embodiments, network monitor entity 102 access syslog or SNMP information from a device itself to determine where a device is communicatively coupled or connected to a network (e.g., without accessing information from a network device or enforcement point). Network monitor entity 102 supports applying access policies in situations where a device is communicatively coupled to a network with more than one connection (e.g., a wired connection and a wireless connection).

Based on the enforcement point, network monitor entity 102 may determine the one or more access rules to be assigned to the one or more enforcement points based on an access policy. In some embodiments, based on information about the one or more enforcement points closest to the device, network monitor entity 102 translates the access policy into one or more commands that will be used to configure the access rules on the one or more enforcement points. The closest enforcement point to a device can be enforcement point where the device is communicatively coupled. The enforcement point may be network device or network infrastructure device closest in proximity (e.g., physical proximity) to the device. The enforcement point comprises the port where the device is communitive coupled to the network, and communication to and from the device is sent first through that port. In some embodiments, the port of the enforcement point is the last point of communication within network infrastructure before communication is sent to the device. In various embodiments, the closest enforcement point is where communication from the device is initially sent when communications are sent from the device (e.g., prior to communications with the network backbone or Internet backbone). For example, the closest enforcement to a device connected to a switch is the switch. As another example, the closest enforcement point to a device wirelessly communicatively coupled to a wireless access point is the wireless access point. In various embodiments, network monitor entity 102 may access the current configuration of the one or more enforcement points to determine the access rules (e.g., ACLs) that are to be applied to the one or more enforcement points, as described herein. In some embodiments, a device is communicatively coupled to a wireless controller via a wireless access point and the wireless controller or a switch is the closest enforcement point (e.g., based on the wireless controller or the switch being able to apply access rules, for instance ACLs, to communications of the device, for instance, in the case where the wireless access point is not able to or does not have the functionality to apply access rules). In various embodiments, a device is communicatively coupled to a layer 3 switch via a layer 2 switch and the layer 3 switch is the closest enforcement point (e.g., based on the layer 3 switch being able to apply access rules, for instance ACLs, to communications of the device, for instance, in the case where the layer 2 switch is not able to or does not have the functionality to apply access rules).

Network monitor entity 102 may then apply or assign the access rules to the one or more enforcement points closest to the device. Network monitor entity 102 may communicate the access rules via application programming interfaces (APIs), command line interface (CLI) commands, Web interface, simple network management protocol (SNMP) interface, etc. In some embodiments, network monitor entity 102 may verify that the one or more enforcement points have been properly or correctly configured based on the access rules.

Network monitor entity 102 may provide an interface (e.g., a graphical user interface (GUI)) for viewing, monitoring, and modifying classification or associated thresholds associated one or more models, as described herein. Network monitor entity 102 may further monitor network traffic over time to reclassify entities as new entities join the network, entities rejoin the network, and new models are made available.

Network monitor entity 102 may further perform a variety of operations including identification, classification, and taking one or more remediation actions (e.g., changing network access of a device, changing the virtual local area network (VLAN), sending an email, sending a short message service (SMS) message, etc.).

Network monitor entity 102 may also parse network traffic. For example, the network monitor entity 102 may parse (e.g., read, analyze, access, etc.) different protocol fields of the network traffic (e.g., packets, messages, frames, etc.). The network monitor entity 102 may provide the field values of the protocol fields (e.g., values of certain portions of network packets, messages, frames, etc.) to one or more different processing engines (e.g., rule engines, machine learning models, etc.) that may request the protocol fields, as discussed in more detail below. The network monitor entity 102 may include a parser and one or more processing engines, as described herein.

An enforcement point may be a router, firewall, switch, hypervisor, software-defined networking (SDN) controller, virtual firewall, or other network device or infrastructure that may have an ACL like or rule like policy or functionality to apply based on the port where a device is communicatively coupled thereto. Enforcements points may also be a next generation firewall (NGFW) and cloud infrastructure. A NGFW can be updated with an ACL like policy regarding a device accessing the Internet. Cloud infrastructure (e.g., Amazon web services (AWS) security groups) can be updated to drop packets from the IP of the device that have a destination outside the cloud. Embodiments are operable to configure enforcement points at the edge of a network where a device is communicatively coupled thereto thereby controlling access of the device on a customized basis (e.g., customized or tailored for the device).

In some embodiments, if the categorization or characteristics functionality is being updated (e.g., which could result in a change in one or more access rules that are assigned to an enforcement point closest a device and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After conformation, the access rules may be changed.

Network monitor entity 102 may be a computing system, network device (e.g., router, firewall, an access point), network access control (NAC) device, intrusion prevention system (IPS), intrusion detection system (IDS), deception device, cloud-based device, virtual machine based system, etc. Network monitor entity 102 may be communicatively coupled to the network device 104 in such a way as to receive network traffic flowing through the network device 104 (e.g., port mirroring, sniffing, acting as a proxy, passive monitoring, etc.). In some embodiments, network monitor entity 102 may include one or more of the aforementioned devices. In various embodiments, network monitor entity 102 may further support high availability and disaster recovery (e.g., via one or more redundant devices).

In some embodiments, network monitor entity 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 102 may be based on a combination of one or more pieces of information including traffic analysis, information from external or remote systems (e.g., system 150), communication (e.g., querying) with an aggregation device (e.g., aggregation device 106), and querying the device itself (e.g., via an API, CLI, web interface, SNMP, etc.), which are described further herein. Network monitor entity 102 may be operable to use one or more APIs to communicate with aggregation device 106, device 120, device 130, or system 150. Network monitor entity 102 may monitor for or scan for entities that are communicatively coupled to a network via a NAT device (e.g., firewall, router, etc.) dynamically, periodically, or a combination thereof.

Information from one or more external or third party systems (e.g., system 150) may further be used for determining one or more tags or characteristics for a device. For example, a vulnerability assessment (VA) system may be queried to verify or check if a device is in compliance and provide that information to network monitor entity 102. External or third party systems may also be used to perform a scan or a check on a device to determine a software version.

Device 130 can include agent 140. The agent 140 may be a hardware component, software component, or some combination thereof configured to gather information associated with device 130 and send that information to network monitor entity 102. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor entity 102 may utilize agent information from the agent 140. While network monitor entity 102 may be able to receive information from agent 140, installation or execution of agent 140 on many entities may not be possible, e.g., IoT or smart devices.

System 150 may be one or more external, remote, or third party systems (e.g., separate) from network monitor entity 102 and may have information about devices 120 and 130 and network coupled devices 122a-b. System 150 may include a vulnerability assessment (VA) system, a threat detection (TD) system, endpoint management system, a mobile device management (MDM) system, a firewall (FW) system, a switch system, an access point system, etc. Network monitor entity 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor entity 102.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor entity 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 102.

The firewall (FW) system may be configured to monitor and control incoming and outgoing network traffic (e.g., based on security rules). The FW system may provide information about a device being monitored including attempts to violate security rules (e.g., unpermitted account access across segments) and network traffic of the device being monitored.

The switch or access point (AP) system may be any of a variety of network devices (e.g., network device 104 or aggregation device 106) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor entity 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of a device being monitored in real-time which can then be used to determine a risk level of the device.

Aggregation device 106 may be configured to communicate with network coupled devices 122a-b and provide network access to network coupled devices 122*a-b*. Aggregation device 106 may further be configured to provide information (e.g., operating system, device software information, device software versions, device names, application present, running, or both, vulnerabilities, patch level, etc.) to network monitor entity 102 about the network coupled devices 122*a-b*. Aggregation device 106 may be a wireless access point that is configured to communicate with a wide variety of devices through multiple technology standards or protocols including, but not limited to, Bluetooth, Wi-Fi™, ZigBee™, Radio-frequency identification (RFID), Light Fidelity (Li-Fi), Z-Wave, Thread, Long Term Evolution (LTE), WiFi™ HaLow, HomePlug, Multimedia over Coax Alliance (MoCA), and Ethernet. For example, aggregation device 106 may be coupled to the network device 104 via an Ethernet connection and coupled to network coupled devices 122*a-b* via a wireless connection. Aggregation device 106 may be configured to communicate with network coupled devices 122*a-b* using a standard protocol with proprietary extensions or modifications.

Aggregation device 106 may further provide log information of activity and properties of network coupled devices 122*a-b* to network monitor entity 102. It is appreciated that log information may be particularly reliable for stable network environments (e.g., where the types of devices on the network do not change often). The log information may include information of updates of software of network coupled devices 122*a-b*.

Figure 2:
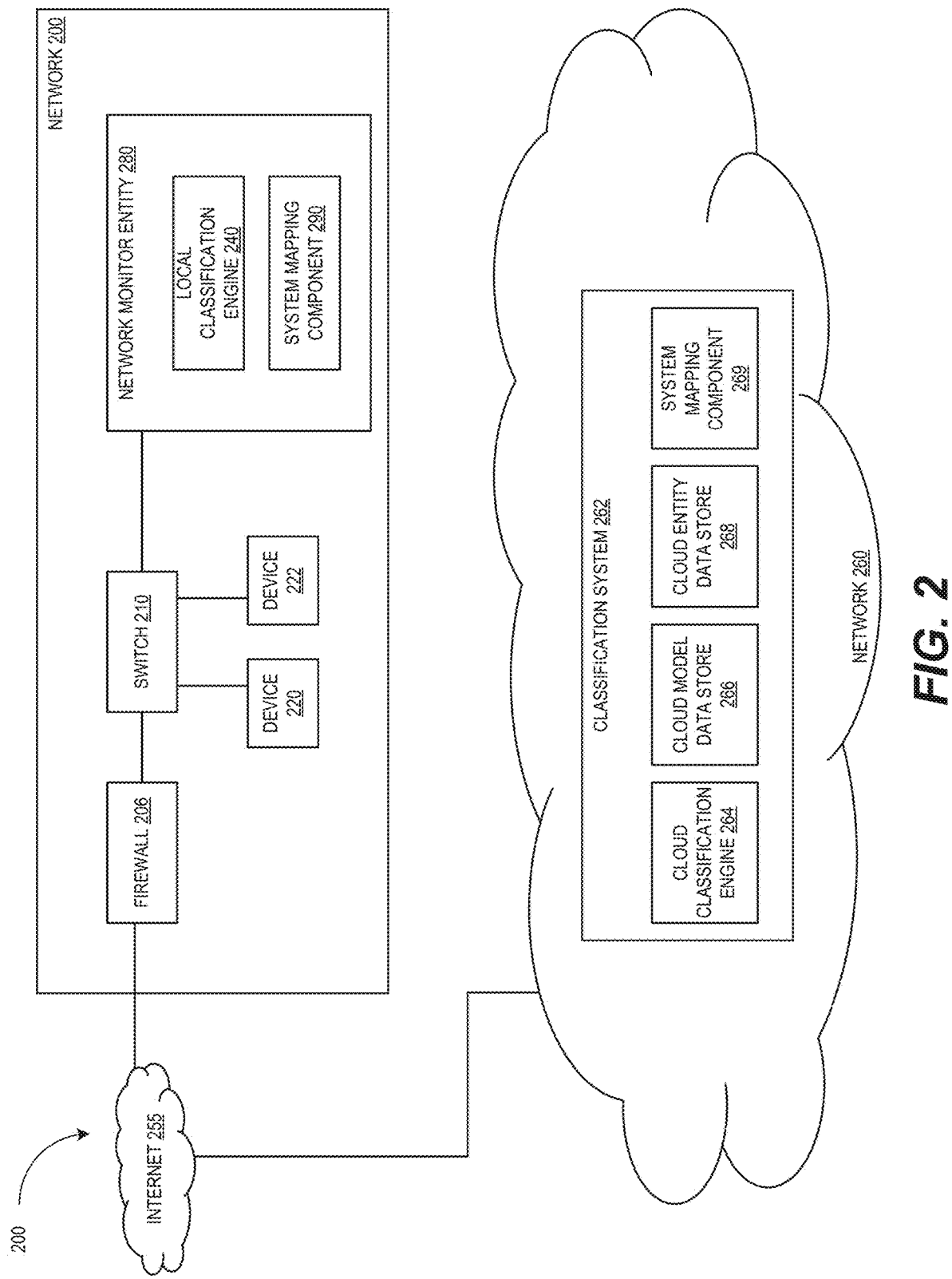
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewall 206 and switch 210) and a network monitor entity 280 (e.g., an example/implementation of network monitor entity 102) which can perform or determine one or more classifications, as described herein, associated with the various entities communicatively coupled in example network 200. Network monitor entity 280 may further identify network systems and devices that are part of network system, and may further generate network system maps for the network system, as described herein.

Classification system 262 may be a cloud classification system operable to perform classification of a device. In some embodiments, classification system 262 may be part of a larger system operable to perform a variety of functions, e.g., part of a cloud based network monitor device/entity, security device, etc. Classification system 262 may further be operable to train one or more models for classifying devices or entities. Example components are shown of network monitor entity 280 and classification system 262 and other components may be present or included.

FIG. 2 shows example devices 220-222 (e.g., devices 106, 122*a-b*, 120, and 130, other physical or virtual devices, other entities, etc.) and it is appreciated that more or fewer network devices or other entities may be used in place of the devices of FIG. 2. Example devices 220-222 may be any of a variety of devices or entities (e.g., smart devices, multimedia devices, networking devices, accessories, mobile devices, IoT devices, retail devices, healthcare devices, etc.), as described herein. Enforcement points including firewall 206 and switch 210 may be any device (e.g., network device 104, cloud infrastructure, etc.) that is operable to allow traffic to pass, drop packets, restrict traffic, etc. Network monitor entity 280 may be any of a variety of network devices or entities, e.g., router, firewall, an access point, network access control (NAC) device, intrusion prevention system (IPS), intrusion detection system (IDS), deception device, cloud-based device or device, virtual machine based system, etc. Network monitor entity 280 may be substantially similar to network monitor entity 102. Embodiments support IPv4, IPv6, and other addressing schemes. In some embodiments, network monitor entity 280 may be communicatively coupled with firewall 206 and switch 210 through additional individual connections (e.g., to receive or monitor network traffic through firewall 206 and switch 210).

Switch 210 communicatively couples the various devices of network 200 including firewall 206, network monitor entity 280, and devices 220-222. Firewall 206 may perform network address translation (NAT). Firewall 206 communicatively couples network 200 to Internet 255 and firewall 206 may restrict or allow access to Internet 255 based on particular rules or ACLs configured on firewall 206. Firewall 206 and switch 210 are enforcement points, as described herein.

Network monitor entity 280 can access network traffic from network 200 (e.g., via port mirroring or SPAN ports of firewall 206 and switch 210 or other methods). Network monitor entity 280 can perform passive scanning of network traffic by observing and accessing portions of packets from the network traffic of network 200. Network monitor entity 280 may perform an active scan of a device of network 200 by sending one or more requests to the device of network 200. The information from passive and active scans of entities of network 200 can be used to determine one or more properties associated with the entities of network 200. The network monitor entity 280 (e.g., the system mapping component 290) may obtain metadata associated with network traffic that is received, detected, etc., during the passive or active scans. The network monitor entity 280 may generate network system maps (e.g., initial network system maps of network systems) based on the metadata.

Network monitor entity 280 includes local classification engine 240 which may perform classification of the entities of network 200 including firewall 206, switch 210, and devices 220-222.

Local classification engine 240 can send data (e.g., property values) about entities of network 200, as determined by local classification engine 240, to classification system 262. Local classification engine 240 may encode and encrypt the data prior to sending the data to classification system 262. In some embodiments, local classification engine 240 checks the confidence of each classification and communicates with classification system 262 data to perform a classification, system mapping, or combination thereof. Local classification engine 240 may receive a classification from classification system 262 which network monitor entity 280 can use to perform various security related or other measures. In some embodiments, classification, system mapping, or a combination thereof, of a device may be performed in part by local network monitor entity 280 (e.g., local classification engine 240) and in part by classification system 262.

The network monitor entity 280 also includes a system mapping component 290. The system mapping component 290 may parse (e.g., analyze, read, decode, decipher, process, etc.) network traffic such as messages, packets, frames, etc. For example, the system mapping component 290 may read values (e.g., field values) of certain portions in network traffic. The network traffic may be transmitted by devices 220 and 222. The system mapping component 290 may parse the network traffic to obtain metadata associated with the network traffic. The system mapping component 290 may identify a network system based on the metadata. The network system may a collection, group, set, etc., of devices or entities that provides one or more network based services, functionalities, operations, etc., for other devices or users of the network 200. The system mapping component 290 may also generate a network system map for the network system. The network system map may identify the different devices that are part of the network system and may also indicate how the different devices or entities are connected or coupled (e.g., communicatively) to each other.

Classification system 262 can perform a cloud based classification, as described herein. In some embodiments, classification system 262 includes cloud classification engine 264, cloud model data store 266, cloud entity data store 268, and model training component 270.

Cloud classification engine 264 may perform classification based on data received from network monitor entity 280 (e.g., based on features determined using properties of a device), as described herein. Cloud classification engine 264 may unencrypt and decode the information received prior to performing a classification. Cloud classification engine 264 may use cloud model data store 266 in determining a classification based on one or more models. A classification determined by cloud classification engine 264 can be sent back to network monitor entity 280. Cloud classification engine 264 may be an example of a processing engine that is not located on the network monitor entity 280 (e.g., that is separate from the network monitor entity 280).

Cloud model data store 266 is model data store (e.g., a cloud model database) that may store different models used to classify different devices. Cloud profile data store 266 is not subject to the resource conditions or limitations (e.g., processing power, storage, etc.) that may impact network monitor entity 280 (e.g., and local classification engine 240). Cloud entity data store 268 is a data store (e.g., a cloud entity database) of device information that has been uploaded to classification system 262. For example, the data in cloud entity data store 268 may include entity or device name, operating system, function, vendor/model, and host information from a variety of networks (e.g., that have network monitor entities configured to upload device information).

In one embodiment, the classification system 262 may include system mapping component 269. The system mapping component 269 may be similar or identical to the system mapping component 290 (of the network monitor entity 280). The system mapping component 269 may perform similar or identical function, actions, operations, etc., as the system mapping component 290. For example, the system mapping component 269 may also obtain metadata from network traffic or generate network system maps based on the metadata.

Both local classification engine 240 and cloud classification engine 264 may use profile based classification along with other classification methods in conjunction with classifications based on various models.

Figure 3:
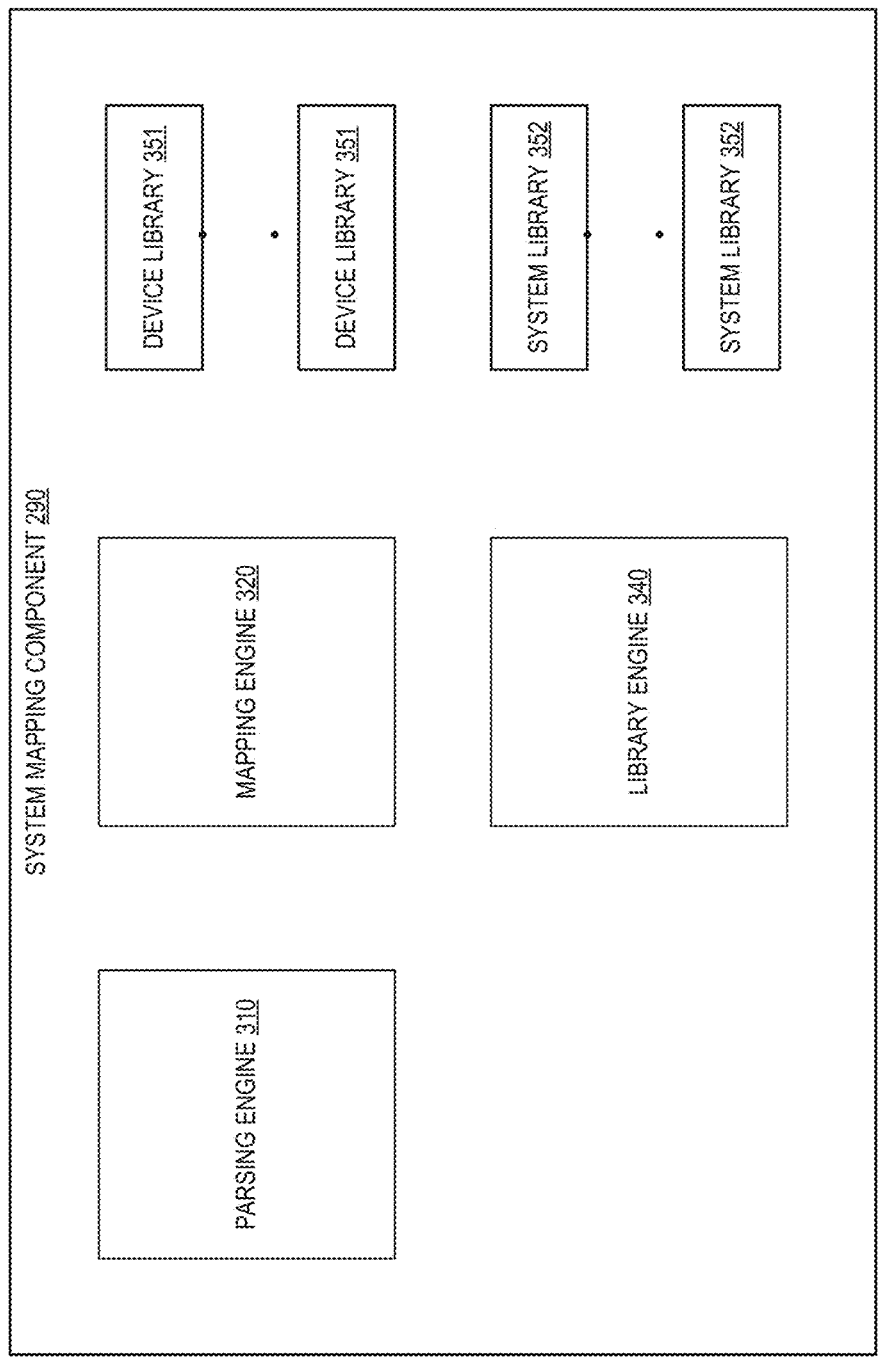
FIG. 3 is a block diagram illustrating an example system mapping component, in accordance with one implementation of the present disclosure.

FIG. 3 is a block diagram illustrating an example system mapping component 290, in accordance with one implementation of the present disclosure. In one embodiment, the system mapping component may be located on or may be part of a network monitor entity 280, also as illustrated in FIG. 2. The network monitor entity 280 may monitor a variety of protocols and entities or devices. Network monitor entity 280 may be operable for a variety of tasks including parsing network traffic, determining one or more properties, determining one or more classifications, etc., as described herein. Network monitor entity 280 can determine one or more enforcement points where a device is communicatively coupled to the network and thereby determine the one or more enforcement points closest to the device. In various embodiments, network monitor entity 280 may access the current configuration of the one or more enforcement points to determine the access rules (e.g., ACLs) that are to be applied to the one or more enforcement points, as described herein. Network monitor entity 280 may then apply or assign the access rules to the one or more enforcement points closest to the device. In another embodiment, the system mapping component may be located on or may be part of a classification system 262 (e.g., part of a cloud based system, remote system, etc.), as illustrated in FIG. 2. Although the system mapping component 290 is illustrated as part of the network monitor entity 280, the system mapping component 290 may be located on another device in other embodiments. For example, the system mapping component 290 may be part of the classification system 262. The system mapping component 290 includes a parsing engine 310, a mapping engine 320, library engine 340, device libraries 351, and system libraries 352.

In one embodiment, the system mapping component 290 may obtain or access network traffic transmitted by one or more devices that are communicatively coupled to a network (e.g., transmitted by devices 220 and 222 in the network 200 of FIG. 2). For example, the system mapping component 290 may access network traffic from the network. The system mapping component 290 can perform passive scanning of network traffic by observing and accessing portions of packets from the network traffic of network (e.g., packets transmitted or received by devices on the network).

In one embodiment, the parsing engine 310 may parse (e.g., analyze, read, decode, decipher, process, etc.) network traffic such as messages, packets, frames, portions thereof, etc. For example, the parsing engine 310 may analyze or parse headers (e.g., a header of a message, packet, etc.), footers (e.g., a footer of a message, packet, etc.), protocols used by network traffic, etc.

In one embodiment, the parsing engine 310 may obtain metadata of the network traffic. The metadata may be used by the mapping engine 320 to classify or identify devices or entities, and to classify or identify network systems, as discussed in more detail below. In one embodiment, the metadata may include data in one or more of headers (e.g., fields in packet header) and footers (e.g., fields in a packet footer) of the network traffic. For example, the metadata may include a source address (e.g., a source IP address of a packet or message), a source port (e.g., a port number), a destination address (e.g., a destination IP of a packet or message), a destination port, a protocol used by the network traffic (e.g., real time streaming protocol (RTSP), H.264, etc.). In another example, the metadata may include the size of the messages or frames in the network traffic (e.g., the packet or frame size). In a further example, the metadata may include scheduling information or statistics about the network data. For example, the metadata may include the average size of the packets, the number of packets that are or were transmitted or received, the frequency at which packets are or were transmitted or received, when packets are or were transmitted or received, etc.

In one embodiment, the parsing engine 310 may obtain the metadata without initially performing a deep packet inspection (DPI) of the network traffic or without analyzing the payloads in the network traffic. For example, the parsing engine 310 may obtain, collect, determine, etc., metadata without processing or analyzing the payload of a message or packet. This may allow the mapping engine 320 to generate a network system map without performing DPI or without analyzing payloads in the network traffic.

In some embodiments, the parsing engine 310 may initially generate the network system map without performing DPI or without analyzing payloads in the network traffic. After generating the network system map (e.g., an initial system map), the parsing engine 310 may perform DPI (or analyze payloads) or may user other modules, system, components, etc., to perform the DPI. The parsing engine 310 may update the system map based on the DPI (or payload analysis) that was performed (after the initial system map was generated). This may allow the parsing engine 310 to update the system map (e.g., to update network system roles, network system types, network system name, etc., of devices in the network system map).

As discussed above, a network system may be a group of devices or entities of the network. For example, a network system may include a subset of a plurality of devices that are on a network. The network system may provide one or more network based services, functionalities, operations, etc., for other devices or users of the network. For example, the network system may be a voice-over-IP (VOIP) system that allows devices (e.g., client devices such as IP phones, applications, etc.) to make audio or phone calls via the network. In another example, the network system may be a security or surveillance system that allows a user to monitor different video feeds (e.g., streaming video) from different cameras (e.g., security cameras). In a further example, the network system may be an application or web system that allows users to access services that are hosted by an application or web server. The network systems described herein are merely examples and other types of network systems may be used in other embodiments.

In one embodiment, the mapping engine 320 may identify, determine, etc., a network system, based on one or more of the metadata, device libraries 351, and system libraries 352. For example, based on the protocols used by network traffic (e.g., based on the RTSP used in the network packets or messages), the mapping engine 320 may determine that the network traffic is for a security system (e.g., a video surveillance system). The mapping engine 320 may also identify the different entities (e.g., other devices of the network) that may be part of the security system. For example, the mapping engine 320 may identify a storage device or system that stores the video, may identify one or more cameras, etc., as part of the security system. The mapping engine 320 may use the device libraries 351 to identify or classify the different devices of the network. The mapping engine 320 may also use the system libraries 352 to identify or classify a network system (e.g., to determine the network system type of the network system).

In one embodiment, the device libraries 351 and the system libraries 352 may include data or information that may be used to classify, identify, etc., devices and network systems. In one embodiment, the device libraries 351 may include conditions, criteria, parameters, etc., that may be used to match against the metadata to identify different types of devices. For example, the device libraries 351 may indicate fields and values of fields that may or should be detected in the network traffic for a specific type of device. In one embodiment, the system libraries 352 may include conditions, criteria, parameters, etc., that may be used to match against the metadata to identify different types of network systems. For example, the system libraries 352 may indicate traffic patterns (e.g., when different messages are transmitted between different devices, how much traffic is transmitted between different pairs or groups of devices, etc.) that may be used to identify a network system. The device libraries 351 may also be referred to as templates, device templates, profiles, or device profiles. The system libraries 352 may also be referred to as templates, system templates, profiles, or system profiles.

In one embodiment, the mapping engine 320 may identify the network system by first identifying a device of the network system. For example, a network system may be a VOIP system. The mapping engine 320 may analyze the metadata of the network traffic obtained by the parsing engine 310. The metadata (e.g., source and destination address) may indicate that multiple devices (e.g., VOIP telephones) communicate with the same device (e.g., a VOIP server, which may be referred to as a private branch exchange (PBX)). Based on the amount of messages or packets that are addressed to the device, the mapping engine 320 may determine that the device or entity is part of a network system.

In some embodiments, the mapping engine 320 may perform analysis of the flow of the network traffic (e.g., may perform network flow analysis). For example, the mapping engine 320 may monitor how different packets flow between different devices (e.g., how a packet is forwarded from one device to another, how a device responds to a packet that is received, etc.). This may allow the mapping engine 320 to identify devices that may be part of a network system. For example, if a packet from a first device is forwarded through two other devices before reaching a destination device, the mapping engine 320 may be able to analyze this flow of packets to identify the first device, the destination device, and the two other devices as being part of the network system. Various existing flow analysis modules, components, systems, etc., may be used by the mapping engine 320. For example, the mapping engine 320 may include these flow analysis modules or the mapping engine 320 may communicate with separate flow analysis modules.

In one embodiment, the mapping engine 320 may also determine a network system type for the network system. For example, the mapping engine 320 may also determine that a device is a VOIP server based on the protocol of the messages communicated to and from the device (e.g., session initiation protocol (SIP) messages). The mapping engine 320 may use one or more of the system libraries 352 and the metadata to determine that the network system is a VOIP system (e.g., a network system that provides users or client devices with telephony services). For example, the system library 352 may indicate that because other devices communicate with the VOIP server and use a particular protocol, the network system is a VOIP system.

In one embodiment, the mapping engine 320 may generate a tuple for each device that is identified or classified by the mapping engine 320. The tuple may include a first portion that may indicate a type of the network system (e.g., a network system type) that the device belongs to. For example, the first portion of the tuple may be a string, alphanumeric text, or other data identifying a network system as a VOIP system, a security system, etc. The tuple may also include a second portion that may indicate a name or identifier for the network system (e.g., a network system name). For example, the second portion of the tuple may be an alphanumeric identifier for the network system. The network system name may allow for two network systems of the same network system type to be distinguished from each other (e.g., distinguishing between a production system and a test system, distinguishing between a first network system for a first corporate site and a second network system for a second corporate site, etc.). The tuple may also include a third portion that may indicate a role that the device or entity may have in the network system. The role for a device or entity may indicate or be related to one or more functions, operations, actions, services, etc., that the device may perform within the network system. For example, the third portion of the tuple may be a string indicating that a device or entity is a "VOIP Server" or a "VOIP Phone."

In one embodiment, the mapping engine 320 may generate a network system map for a network system. The network system map may identify the devices (e.g., entities) that are part of the network system. For example, the system map may identify servers, databases or data storage devices, client devices, etc., that are part of the network system. The network system map may also indicate interconnections or communicative couplings between different devices (e.g., how different devices are coupled to each other). For example, for each device, the network system map may indicate, illustrate, etc., all of the devices that the respective device is coupled to.

In one embodiment, the network system map for a network system (e.g., a VOIP system, a security or security system, etc.), may be generated based on one or more network system types, one or more network system names, and one or more network system roles for the devices or entities. For example, each device in the network system map may be associated with a respective network system type, a respective network system name, and a respective network system role. As discussed above, the network system type, the network system name, and the network system role for a device or entity may be referred to as a tuple.

In one embodiment, the mapping engine 320 may identify the network system and generate the system map based on other devices that are at different coupling levels to a first device or a starting device. For example, the mapping engine 320 may initially identify a first device of the network system. The mapping engine 320 may then identify a first set of devices that are coupled (e.g., communicatively coupled) to the first device. The first set of devices that are coupled to the first device may be devices that are at a first connection (or communicative coupling) level to the first device. The mapping engine may then identify a second set of devices that are coupled to the first set of devices. The second set of devices may be coupled to the first device at a second coupling level to the first device. The mapping engine may continue to identify devices at additional coupling levels until all devices that are coupled to each other within the network system are identified.

In one embodiment, the mapping engine 320 may update a network system map (for a network system). For example, the mapping engine 320 may analyze metadata of network traffic and may generate an initial network system map, as discussed above. As additional network traffic is received (from the devices or entities in the network), the mapping engine 320 may analyze additional metadata of the additional network traffic. For example, the parsing engine 310 may analyze or parse the additional network traffic to obtain the additional metadata and the mapping engine 320 may analyze or process the additional metadata based on the device libraries 351 and the system libraries 352. The additional metadata may provide new or additional information about the network system and the devices in the network system. For example, the additional metadata may include additional fields (e.g., fields in packet headers of footers), may include additional protocols, changes in the size of the network traffic, etc. The mapping engine 320 may update the network system map based on the additional metadata. For example, the mapping engine 320 may update the network system type associated with one or more devices in the network system map. In another example, the mapping engine 320 may update the network system role associated with one or more devices in the network system map.

In one embodiment, the mapping engine 320 may receive input (e.g., user input) and may generate or update a network system map based on the input. For example, a user may provide user input (to the mapping engine 320) indicating that a device should be added to the network system map for a network system. In another example, a user may provide user input updating a network system role for a device in a network system map.

In another embodiment, the mapping engine 320 may use other inputs and/or data to generate a network system map. For example, the mapping engine 320 may use classifications provided by other modules, systems, components, etc., to identify devices, network system roles, etc. In another example, the mapping engine 320 may use domain name service (DNS) names to identify devices or network systems. For example, the DNS of a device may be used to identify a network system role. In a further example, the vendor or manufacturer of a device may be used to identify a network device or a network system. For example, a vendor or model number of a device may be used to determine a network system role for a device.

In one embodiment, the system mapping component 290 may generate, create, etc., one or more of a device library 351 and a system library 352, based on the network traffic that is obtained or received. For example, the library engine 340 may analyze the network traffic and/or the metadata associated with the network traffic to automatically generate (e.g., create) a new device library 351 or a new system library 352. The library engine 340 may include a module or component that allows new libraries to be created. For example, the library engine 340 may include a machine learning model, rule-based engine or system, etc. The new device library 351 may allow the system mapping component 290 to identify, classify, etc., additional or new types of devices. The new system library 352 may allow the system mapping component 290 to identify, classify, etc., additional or new types of network systems. The library engine 340 may also allow new device libraries 351 and new system libraries 352 to be added to the system mapping component 290. For example, the library engine 340 may allow a user to transmit or upload new device libraries 351 and new system libraries 352 to the system mapping component 290.

In one embodiment, the system mapping component 290 may update one or more device libraries 351 and system libraries 352. For example, a user may modify a device library 351 to add additional parameters, criteria, etc., for classifying a type of device. The system mapping component 290 may allow the user to update the device library 351 (e.g., via a user interface, such as a graphical user interface (GUI), a command line interface (CLI), etc.). The updates to the device libraries 351 and system libraries 352 may be obtained from a network location (e.g., a network storage system, a cloud computing or storage platform, etc.) or may be provided to the network monitor entity 280 via a local interface (e.g., a local port or connection, such as a universal serial bus (USB) port). The updates to the device libraries 351 and system libraries 352 may also be provided by a vendor or manufacturer of the network monitor entity 280.

As discussed above, previous identification or classification approaches would identify individual devices in a network, but would not identify a network system and would not identify which devices were part of a network system (e.g., the devices that operate together in the network system). The system mapping component 290 may allow network systems to be identified based on metadata associated with the network traffic.

In addition, by not initially performing deep packet inspection, the system mapping component 290 may use fewer resources (e.g., computing resources, memory resources, etc.) of the network monitor entity 280. This may also reduce the cost of operation for the network monitor entity and may allow the network monitor entity 280 to operate more efficiently. The system mapping component 290 may also be able identify network systems and generate network system maps more quickly by using the metadata associated with the network traffic rather than performing deep packet inspection on the network traffic.

In some embodiments, the network maps may allow a user to more easily visualize or catalog the different network systems that operate within a network. The networks maps also allow a user to more easily visualize or catalog the different devices that are part of the different network systems.

In one embodiment, the network maps may allow a network to be more secure or protected. For example, by identifying the different devices that are part of the different network systems, a user can more easily isolate the devices of the different network systems from each other. This allows the user to secure the different network systems from malicious users which may attempt to comprise a device in a first network system by routing data from another device in a second network system.

In another embodiment, the network maps may allow a user to provide role based access control for different devices. For example, based on the network system type or network system role of a device, certain access or permissions may be automatically granted (or not granted) to a device. This allows the user to more easily control the access or permissions that are granted to a device.

In a further embodiment, the network maps may also allow a user to more easily assess vulnerable portions of a network system. For example, a network map may identify a main controller or server for a network system. If multiple client devices communicate with the main server, the security of the main server should be prioritized to prevent the main server from being compromised.

Figure 4:
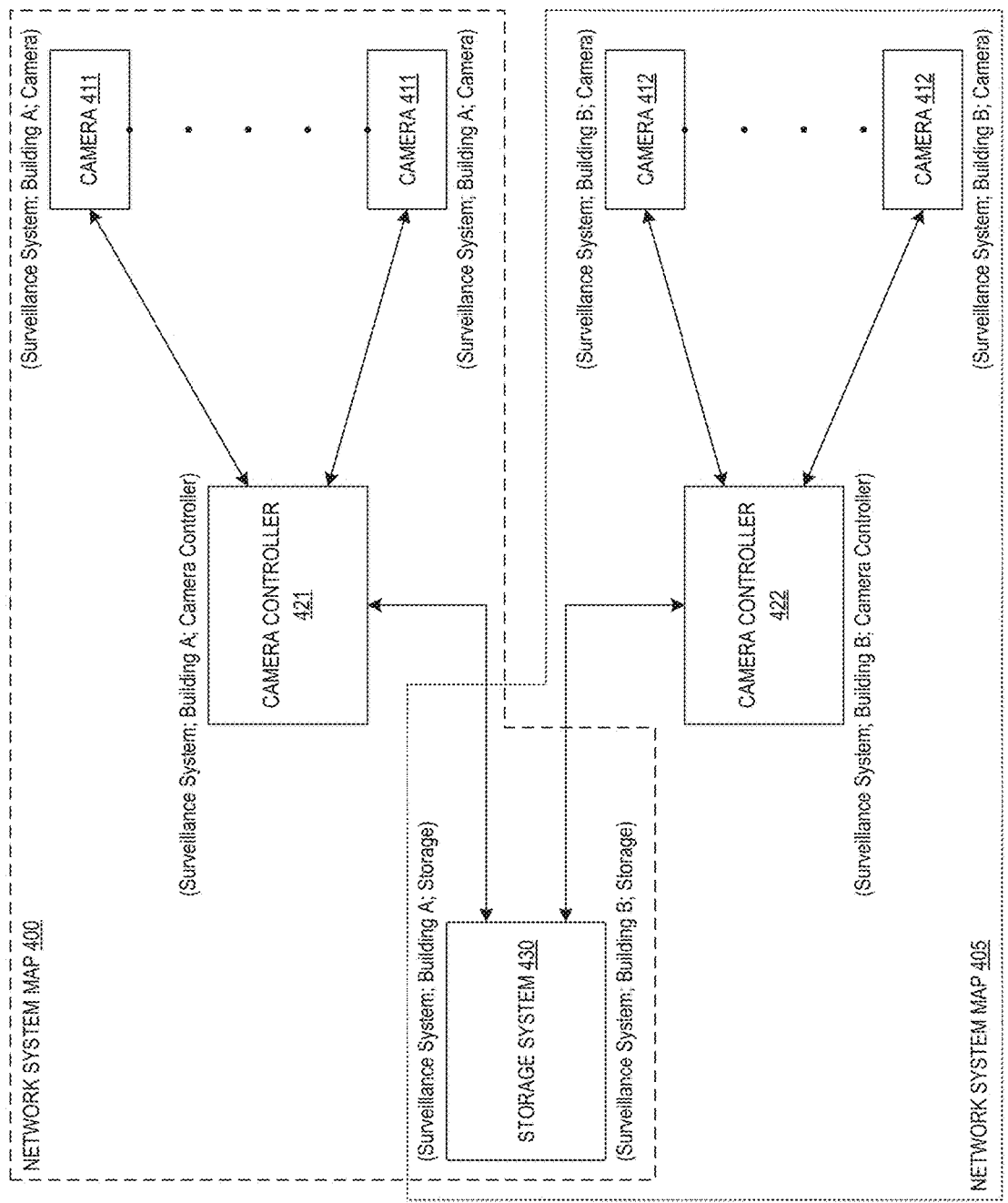
FIG. 4 is a block diagram illustrating example network system maps, in accordance with one implementation of the present disclosure.

FIG. 4 is a block diagram illustrating example network system maps 400 and 405, in accordance with one implementation of the present disclosure. As discussed above a network system map may identify the devices (e.g., entities) that are part of the network system. A network system map may also indicate interconnections or couplings between different devices. Network system map 400 is for a first network system and network system map 405 is for a second network system. The first and second network systems (represented by network system maps 400 and 405 respectively) may be surveillance systems (e.g., a security system, a surveillance camera system, etc.). In one embodiment, the network system maps 400 and 405 may be presented to the user via a user interface to allow a user to view the devices that are part of the network system maps 400 and 405 and how they are interconnected or communicatively coupled.

Network system map 400 includes storage system 430, camera controller 421, and cameras 411. The network system map 400 includes lines and arrows that indicate how the storage system 430, camera controller 421, and cameras 411 are interconnected (e.g., cameras 411 are communicatively coupled to the camera controller 421). The cameras 411 may be video cameras, digital cameras, etc., for a first network system (e.g., a first surveillance system). The camera controller 421 may be a computing device, server, etc., that may be used to manage or view the streaming video from the cameras 411. The storage system 430 may be one or more storage devices or systems that may store the streaming videos. Each device in the network system map 400 may be associated with or may include a tuple. As discussed above, a tuple may include a network system type, a network system name, and a network system identifier. For example, each camera 411 is associated with the tuple "(Surveillance System; Building A; Camera)," where "Surveillance System" indicates the network system type, "Building A" indicates the network system name, and "Camera" indicates the network system role. The camera controller 421 is associated with the tuple "(Surveillance System; Building A; Camera Controller)," where "Surveillance System" indicates the network system type, "Building A" indicates the network system name, and "Camera Controller" indicates the network system role. The storage system 430 is associated with the tuple "(Surveillance System; Building A; Camera Controller)," where "Surveillance System" indicates the network system type, "Building A" indicates the network system name, and "storage" indicates the network system role.

Network system map 405 includes storage system 430, camera controller 422, and cameras 412. The network system map 405 includes lines and arrows that indicate how the storage system 430, camera controller 422, and cameras 412 are interconnected (e.g., cameras 412 are communicatively coupled to the camera controller 422). The cameras 412 may be similar to cameras 411 and the camera controller 422 may be similar to camera controller 421. Each device in the network system map 405 may be associated with or may include a tuple. For example, each camera 412 is associated with the tuple "(Surveillance System; Building B; Camera)," where "Surveillance System" indicates the network system type, "Building B" indicates the network system name, and "Camera" indicates the network system role. The camera controller 422 is associated with the tuple "(Surveillance System; Building B; Camera Controller)," where "Surveillance System" indicates the network system type, "Building B" indicates the network system name, and "Camera Controller" indicates the network system role. The storage system 430 is associated with the tuple "(Surveillance System; Building B; Camera Controller)," where "Surveillance System" indicates the network system type, "Building B" indicates the network system name, and "storage" indicates the network system role.

As illustrated in FIG. 4, a device may be included in multiple network system maps. For example, storage system 430 is included in both network system map 400 and network system map 405. A device or entity may be included in multiple network system maps if multiple network systems include or share the device. For example, the storage system 430 may be used to store video streams (e.g., video data) for the first and second network systems. Thus, the storage system 430 may be associate with multiple tuples (e.g., (Surveillance System; Building B; Camera Controller) and (Surveillance System; Building B; Camera Controller)).

As discussed above, a system mapping component (e.g., system mapping component 290 illustrated in FIGS. 2 and 3) may identify a first device in a network system and then identify other devices that are connected or coupled to the first device at different connection or coupling levels (e.g., coupled to the first device via one or more other devices in series). For example, the system mapping component may identify or classify the camera controllers 421 and 422 first. The system mapping component may then identify or classify the other devices at the next coupling level (e.g., a first coupling level which includes devices that are communicatively coupled to the camera controllers 421 and 422, such as cameras 411 and 412).

Figure 5:
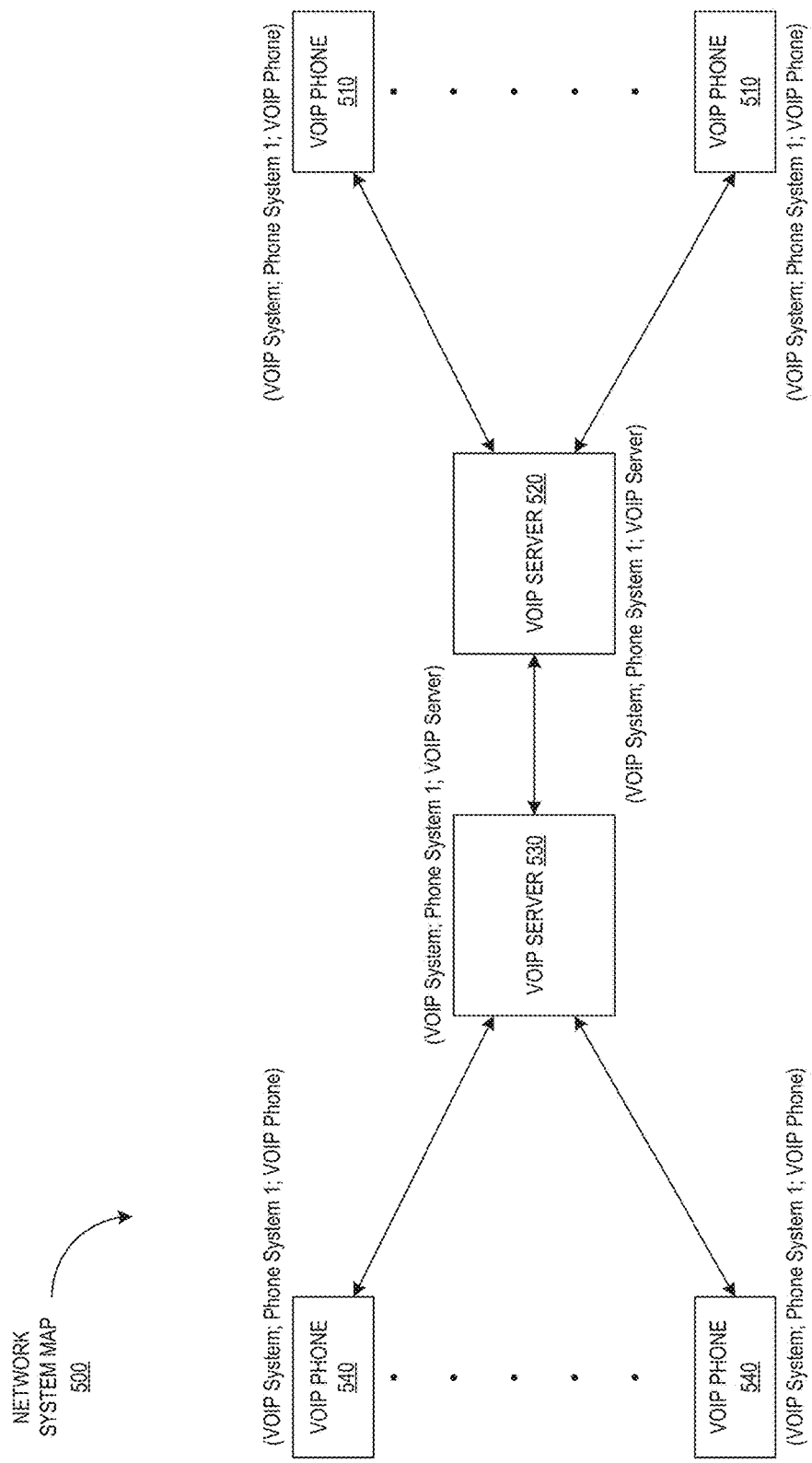
FIG. 5 is a block diagram illustrating an example network system map, in accordance with one implementation of the present disclosure.

FIG. 5 is a block diagram illustrating an example system map 500, in accordance with one implementation of the present disclosure. As discussed above a network system map may identify the devices (e.g., entities) that are part of the network system and how the devices are interconnected or (communicatively) coupled. Network system map 500 is for a VOIP network system. The network system map 500 may be presented to the user via a user interface to allow a user to view the devices that are part of the network system map 500 (e.g., are part of the VOIP system) and how they are interconnected or coupled.

Network system map 500 includes VOIP phones 510, VOIP server 520, VOIP server 530, and VOIP phones 540. The network system map 500 includes lines and arrows that indicate how VOIP phones 510, VOIP server 520, VOIP server 530, and VOIP phones 540 are interconnected (e.g., cameras VOIP phones are communicatively coupled to VOIP server 520, VOIP server 520 is communicatively coupled to VOIP server 530, etc.). The VOIP phones 510 and 540 may be IP phones or computing devices that include a VOIP application. The VOIP servers 520 and 530 may be devices (e.g., computing or network devices) that provide telephone services to VOIP phones. Each device in the network system map 500 may be associated with or may include a tuple. As discussed above, a tuple may include a network system type, a network system name, and a network system identifier. For example, each VOIP phone 510 and 540 is associated with the tuple "(VOIP System; Phone System 1; VOIP Phone)," where "VOIP System" indicates the network system type, "Phone System 1" indicates the network system name, and "VOIP Phone" indicates the network system role. The VOIP servers 530 are associated with the tuple "(VOIP System; Phone System 1; VOIP Server)," where "VOIP System" indicates the network system type, "Phone System 1" indicates the network system name, and "VOIP Server" indicates the network system role.

As discussed above, a system mapping component (e.g., system mapping component 290 illustrated in FIGS. 2 and 3) may identify a first device in a network system and then identify other devices that are connected or coupled to the first device at different coupling levels (e.g., coupled to the first device via one or more other devices in series). For example, the system mapping component may identify or classify VOIP server 520 first. The system mapping component may then identify or classify devices at the next connection or coupling level (e.g., a first coupling level) which includes devices that are communicatively coupled to the VOIP server 520, such as VOIP server 530 and VOIP phones 510. The system mapping component may then identify or classify devices at the next connection or coupling level (e.g., a second coupling level) which includes devices that are communicatively coupled to the VOIP server 530, such as VOIP phones 540.

Figure 6:
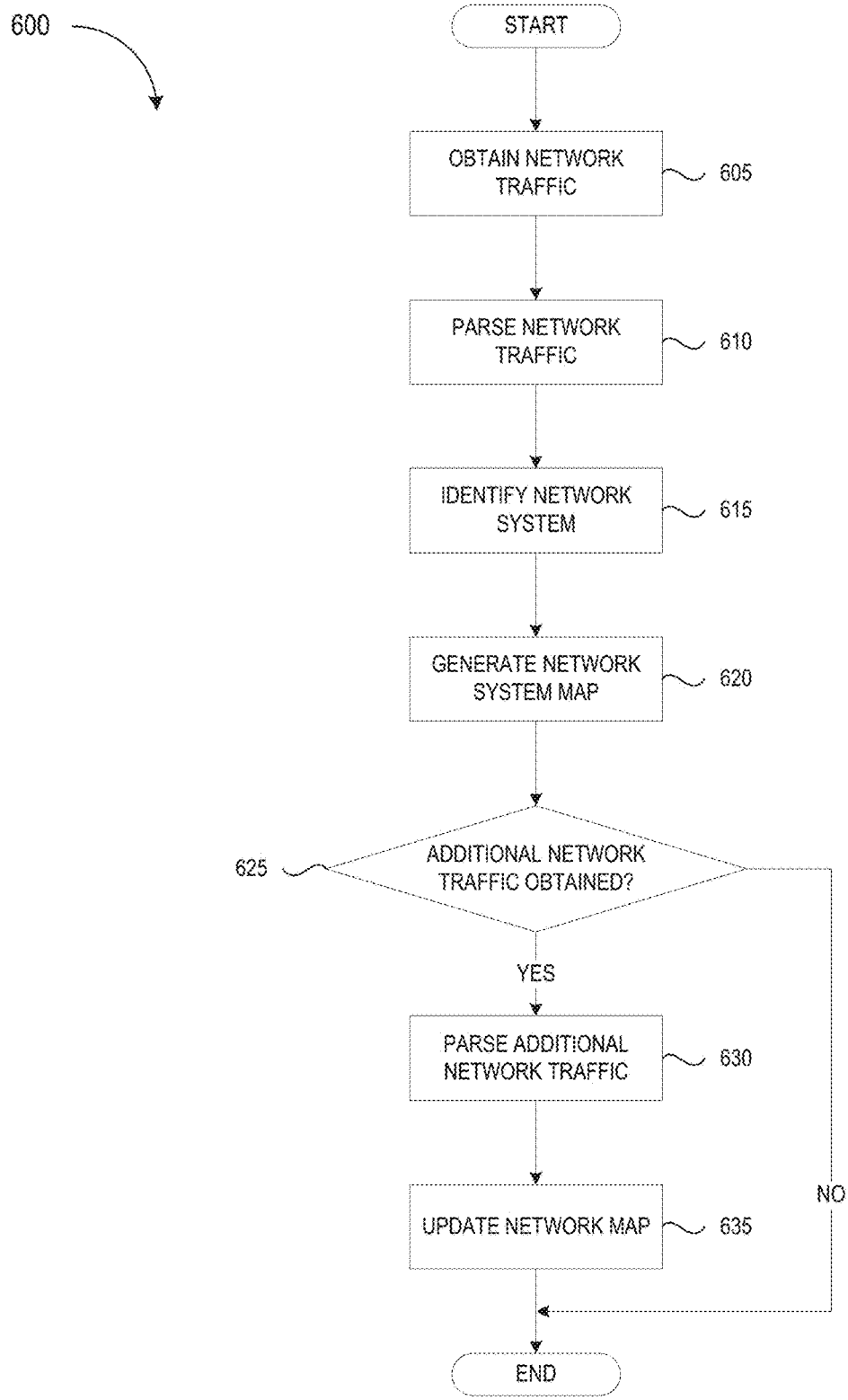
FIG. 6 depicts a flow diagram of aspects of process for generating network system maps, in accordance with one implementation of the present disclosure.

With reference to FIG. 6, flowchart 600 illustrates example operations used by various embodiments. Although specific operation blocks ("blocks") are disclosed in flowchart 600, such blocks are examples. That is, embodiments are well suited to performing various other blocks or variations of the blocks recited in flowchart 600. It is appreciated that the blocks in flowchart 600 may be performed in an order different FIG. 6 depicts a flow diagram of aspects of process 600 for generating network system maps, in accordance with one implementation of the present disclosure. Various portions of process 600 may be performed by different components (e.g., components of system 800) of an entity or device (e.g., network monitor entity 102, network monitor entity 280, system mapping component 290, etc.). Process 600 may parse network traffic to obtain metadata and may generate a network system map based on the metadata and one or more libraries.

At block 605, network traffic is obtained (e.g., accessed, read, analyzed, etc.). The traffic may have been transmitted by and/or received by a device. The traffic may be obtained by a network monitoring device (e.g., network monitoring entities 102 or 280) via a port mirroring or SPAN port or via another method, as described herein. The network traffic (e.g., packets, messages, frames, etc.) may include one or more properties and property values for each device communicatively coupled to one or more networks. The one or more properties and property values may be extracted from the network traffic. The one or more properties and property values may be based on one or more fields or portions of the one or more fields within network traffic (e.g., packets, messages, frames, etc.). The network traffic may include active scanning properties (e.g., if active scanning is enabled).

The network traffic is parsed at block 610. For example, parsing engine 310 illustrated in FIG. 3 may parse the network traffic by analyzing or reading certain or select portions of the network traffic (e.g., by analyzing the headers, footers, etc., of packets). The network traffic may be parsed to obtain metadata associated with the network traffic. The metadata may include portions of the network traffic such as portions of the headers or footers. The network traffic may also include information such as when packets were transmitted, sizes of packets, an order of packets, etc.

At block 615, a network system is identified based on the metadata. For example, mapping engine 320 (illustrated in FIG. 3) may analyze the metadata to identify devices that may be part of the network system. The mapping engine 320 may determine network system types, network system names, and network system roles for the different devices or entities of the network system, based on the metadata. The mapping engine 320 may use device libraries and system libraries to determine, identify, etc., network system types, network system names, and network system roles for the different devices of the network system.

A network system map is generated at block 620. The network system map may identify all of the devices that are part of the network system. For example, the network system map may include a list of all of the devices that are in the network system. The network system map may also indicate how the different devices are interconnected or coupled (as illustrated in FIGS. 4 and 5). The network system map may also include tuple for each device in the network system. A tuple for a device may include the network system type, the network system name, and a network system role associated with the device.

At block 625, the process 600 may determine whether additional network traffic has been obtained or received. If no additional network traffic has been received, the process 600 may end. If additional network traffic has been received, the additional network traffic is parsed to obtain additional metadata or other data at block 630. The network map may be updated at block 635. For example, the additional metadata may allow the mapping engine 320 to narrow the classification of a device (e.g., to narrow the classification of a device from a streaming media device to a VOIP phone).

The mapping engine 320 may update the network system role in the tuple for the device (in the network system map) to reflect the updated classification.

Figure 7:
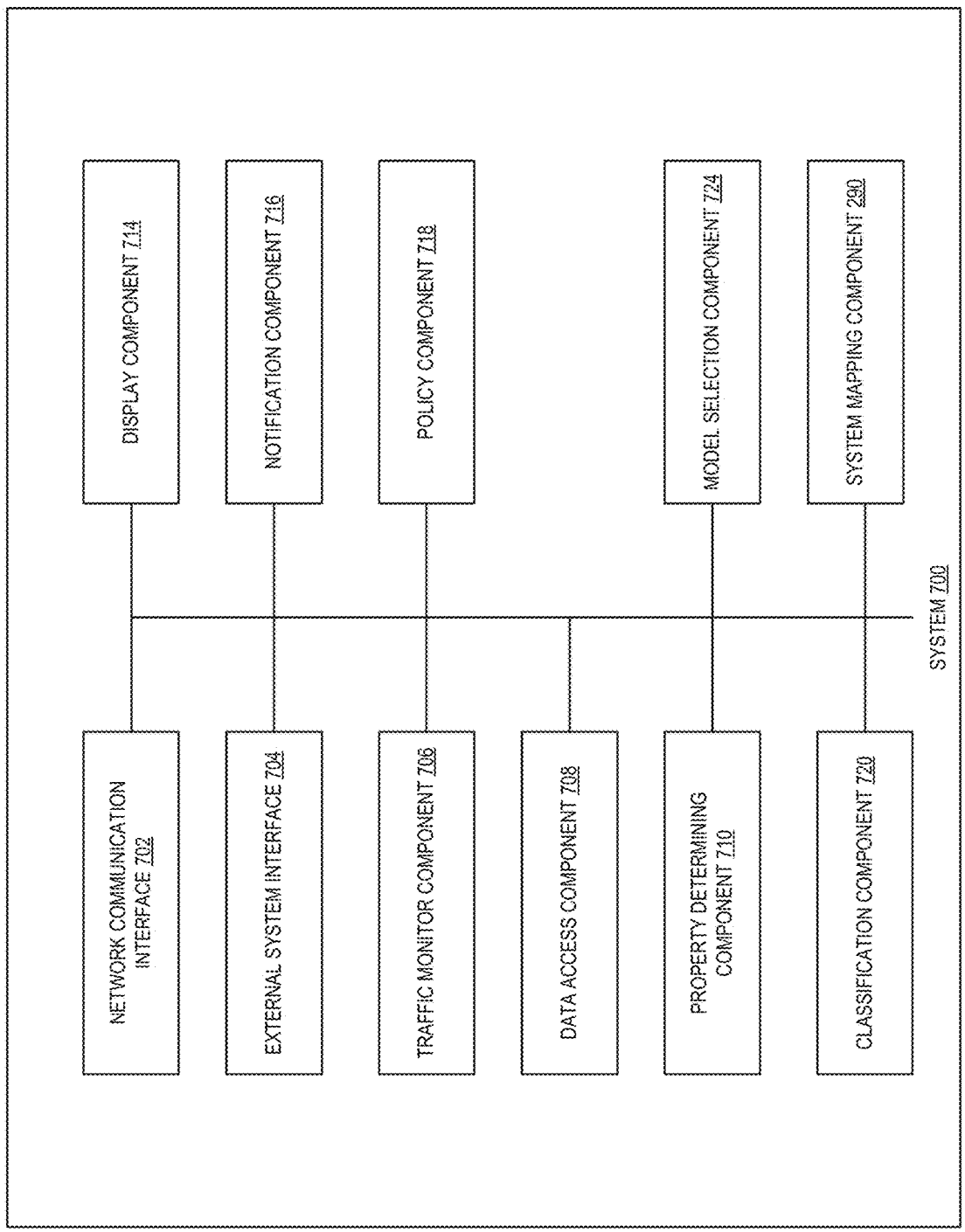
FIG. 7 depicts illustrative components of a system for generating network system maps, in accordance with one implementation of the present disclosure.

FIG. 7 illustrates example components used by various embodiments. Although specific components are disclosed in system 700, it should be appreciated that such components are examples. That is, embodiments are well suited to having various other components or variations of the components recited in system 700. It is appreciated that the components in system 700 may operate with other components than those presented, and that not all of the components of system 700 may be required to achieve the goals of system 700.

FIG. 7 depicts illustrative components of a system for generating network system maps, in accordance with one implementation of the present disclosure. Example system 700 includes a network communication interface 702, an external system interface 704, a traffic monitor component 706, a data access component 708, a property determination component 710, a display component 714, a notification component 716, a policy component 718, a classification component 720, a model training component 722, and a model selection component 724. The components of system 700 may be part of a computing system or other electronic device (e.g., network monitor entity 102 or network monitor entity 280) or a virtual machine or device and be operable to monitor and one or more entities communicatively coupled to a network, monitor network traffic, determine one or more classifications of a device, perform one or more actions, as described herein. For example, the system 700 may further include a memory and a processing device, operatively coupled to the memory, which may perform the operations of or execute the components of system 700. The components of system 700 may access various data and characteristics or properties associated with a device (e.g., network communication information) and data associated with one or more entities. It is appreciated that the modular nature of system 700 may allow the components to be independent and allow flexibility to enable or disable individual components or to extend, upgrade, or combination thereof components without affecting other components thereby providing scalability and extensibility. System 700 may perform one or more blocks of sequence or flow diagram 600. In some embodiments the components of 700 may be part of network monitor entity (e.g., network monitor entities 102 and 280), in the cloud, or the various components may be distributed between local and cloud resources.

Communication interface 702 is operable to communicate with one or more entities (e.g., network device 104, firewall 206, switch 210, other devices coupled thereto, devices 220-222, etc.) coupled to a network that are coupled to system 700 and receive or access information about entities (e.g., device information, device communications, device characteristics, properties, etc.), access information as part of a passive scan, send one or more requests as part of an active scan, receive active scan results or responses (e.g., responses to requests), as described herein. The communication interface 702 may be operable to work with one or more components to initiate access to characteristics or determination of characteristics of a device to allow determination of one or more properties which may then be used for device compliance, asset management, standards compliance, classification, identification, etc., as described herein. Communication interface 702 may be used to receive and store network traffic for determining properties, as described herein.

External system interface 704 is operable to communicate with one or more third party, remote, or external systems to access information including characteristics or properties about a device (e.g., to be used to determine a security aspects). External system interface 704 may further store the accessed information in a data store. For example, external system interface 704 may access information from a vulnerability assessment (VA) system to enable determination of one or more compliance or risk characteristics associated with the device. External system interface 704 may be operable to communicate with a vulnerability assessment (VA) system, an advanced threat detection (ATD) system, a mobile device management (MDM) system, a firewall (FW) system, a switch system, an access point (AP) system, etc. External system interface 704 may query a third party system using an API or CLI. For example, external system interface 704 may query a firewall or a switch for information (e.g., network session information) about a device or for a list of entities that are communicatively coupled to the firewall or switch and communications associated therewith. In some embodiments, external system interface 704 may query a switch, a firewall, or other system for information of communications associated with a device.

Traffic monitor component 706 is operable to monitor network traffic to determine if a new device has joined the network or a device has rejoined the network and monitor traffic for analysis by data access component 708, and classification component 720, as described herein. Traffic monitor component 706 may have a packet engine operable to access packets of network traffic (e.g., passively) and analyze the network traffic. The traffic monitor component 706 may communicate with, interact with, operate in conjunction with, etc., system mapping component 290. The traffic monitor component 706 may further be able to access and analyze traffic logs from one or more entities (e.g., network device 104, system 150, or aggregation device 106) or from a device being monitored. The traffic monitor component 706 may further be able to access traffic analysis data associated with a device being monitored, e.g., where the traffic analysis is performed by a third party system.

Data access component 708 may be operable for accessing data including metadata associated with one or more network monitoring entities (e.g., network monitor entities 102 or 280-282), including properties that the network monitoring device is monitoring or collecting, software versions (e.g., of the profile library of the network monitoring device), and the internal configuration of the network monitoring device. The data accessed by data access component 708 may be used by embodiments to perform classification including ensuring that the most up to date models, profiles, and other classification information is being used (e.g., by classification component 720). Data access component 708 may further access vertical or environment data and other user associated data, including vertical, environment, common type of devices for the network or network portions, segments, areas with classification issues, etc., which may be used for classification.

Data access component 708 may access data associated with active or passive traffic analysis or scans or a combination thereof. Data access component may further be able to access and analyze traffic logs from one or more entities (e.g., network device 104, system 150, or aggregation device 106) or from a device being monitored. Data access component 708 may further be able to access traffic analysis data associated with a device being monitored, e.g., where the traffic analysis is performed by a third party system. Information accessed by data access component 708 may be stored, displayed, and used as a basis for classification, generating system maps, presenting or displaying network system maps, updating or modifying network system maps, etc., as described herein.

Property determination component 710 is configured to determine one or more properties associated with a device, as described herein. Property determination component 710 may determine one or more properties and associated values associated with a device based on analysis (e.g., including extraction of properties and values, for instances, based on one or more fields of packets, frames, messages, etc.) of network traffic, as described herein. The properties can then be stored and used by other components (e.g., classification component 720, model training component 722, model selection component 724) for performing classification, training one or more models, evaluating one or more models, and performing actions (e.g., security actions), as described herein.

Classification component 720 is configured to determine one or more classifications, as described herein. Classification component 720 is further configured to determine a confidence associated with a classification (result), as described herein, which may then be compared with a confidence threshold, as described herein. Classification component 720 may use model selection component 724 to select one or more models for classification. Classification component 720 may further use profile libraries, entity or device fingerprints, etc., in conjunction or in place of classification using the one or more models, as described herein. Classification component 720 may use local resources (e.g., local classification engine 240), cloud resources (e.g., classification system 262), or a combination thereof for determining a classification.

Model selection component 724 is configured to select a model for use by classification component 720, as described herein. Model selection component 724 may select a model based on parsing network traffic. For example, a model for classifying a device as a media streaming device, a smart device, etc., may be identified based on one or more field values determined by parsing network traffic.

System mapping component 290 is configured to obtain network traffic from a network. The network traffic is transmitted by a plurality of devices or entities communicatively coupled to the network. System mapping component 290 is further configured to parse the network traffic to obtain metadata or other data from the network traffic. System mapping component 290 is further configured to identify a network system based on the metadata of the network traffic and a set of libraries. System mapping component 290 is further configured to generate a network system map for the network system.

Display component 714 is configured to optionally display one or more graphical user interfaces or other interfaces (e.g., command line interface) for depicting various information associated with entities, classification, thresholds (e.g., confidence thresholds), and models, as described herein. In some embodiments, display component 714 may display or render, a network graph of entities including one or more classifications, access rules associated with entities, and other access rule information (e.g., access policies, access templates, etc.), network system maps, etc.

Notification component 716 is operable to initiate one or more notifications based on the results of one or more classifications and other analysis of communications, as described herein. The notification may be any of a variety of notifications, e.g., IT ticket, email, SMS, a HTTP notification, etc., as described herein.

Policy component 718 is operable for initiating or triggering one or more remediation actions or security actions according to one or more policies, e.g., based on one or more classifications, as described herein. Policy component 718 may further be configured to perform other operations including checking compliance status, finding open ports, etc. In some embodiments, policy component 718 may verify that an assignment of one or more access rules to one or more enforcements points has been properly assigned or configured. Policy component 718 may restrict network access, signal a patch system or service, signal an update system or service, etc., as described herein. The policy component 718 may thus, among other things, invoke automatically (e.g., without user or human interaction) patching, automatically updating, and automatically restrict network access of a device (e.g., that has out-of-date software or based on access rule violation or attempted violation).

The actions may include restricting network access to a particular level (e.g., full, limited, or no network access, for instance via an enforcement point), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

In one embodiment, the policy component 718 is operable for initiating or triggering one or more remediation actions or security actions according to one or more policies, based on network systems or network system maps. For example, the policy component 718 may apply a policy to devices that are part of a network system. The policy component 718 may also apply a policy to a subset of the devices in a network system. For example, the policy component 718 may apply a policy to all devices that have a particular network system role within the network system.

The system 700 may be software stored on a non-transitory computer readable medium having instructions encoded thereon that, when executed by a processing device, cause the processing device to obtain network traffic from a network. The network traffic is transmitted by a plurality of devices or entities communicatively coupled to the network. The instructions may further cause the processing device to parse the network traffic to obtain metadata of the network traffic. The instructions may further cause the processing device to identify a network system based on the metadata of the network traffic. The network system may include a subset of the plurality of devices. The network system may provide a network based functionality for one or more users or other devices via the network. The instructions may further cause the processing device to generate a network system map for the network system. The network system map may indicate each of the subset of the plurality of devices and couplings between the subset of the plurality of devices.

In various embodiments, to identify the network system, the processing device is further to select a first device from the plurality of devices, based on one or more of the metadata of the network traffic and additional data. The network system comprises the first device. The instructions may further cause the processing device to determine a network system type for the network system, a network system name for the network system, and a network system role for the first device based on the metadata of the network traffic. The network system role indicates a role of the first device within the network system. In some embodiments, the network system map is generated based on the network system type for the network system, the network system name for the network system, and the network system role. In other embodiments, to identify the network system, the processing device is further to select additional devices at different coupling levels to the first device. The network system further includes the additional devices. The instructions may further cause the processing device to determine additional network system roles for the additional devices. The network system map may be generated further based on the additional network system roles for the additional devices.

In some embodiments, the metadata of the network traffic includes one or more of headers of the network traffic, footers of the network traffic, one or more protocols of the network traffic, and one or more sizes of the network traffic. In other embodiments, to parsing the network traffic, the processing device is further to determine one or more of a set of times when packets of the network traffic were transmitted and a set of sizes of the packets of the network traffic.

In one embodiment, the network system map is initially generated without performing deep packet inspection on the network traffic or without parsing payloads of the network traffic. In another embodiment, the network system map is generated further based on a set of libraries. The set of libraries include data for classifying different devices of the network and for classifying different network systems.

In some embodiments, the instructions may cause the processing device to obtain additional network traffic from the network. The additional network traffic is transmitted by the plurality of devices communicatively coupled to the network. The instructions may further cause the processing device to parse the additional network traffic to obtain additional metadata of the additional network traffic. The instruction may further cause the processing device to update the network system map for the network system.

Figure 8:
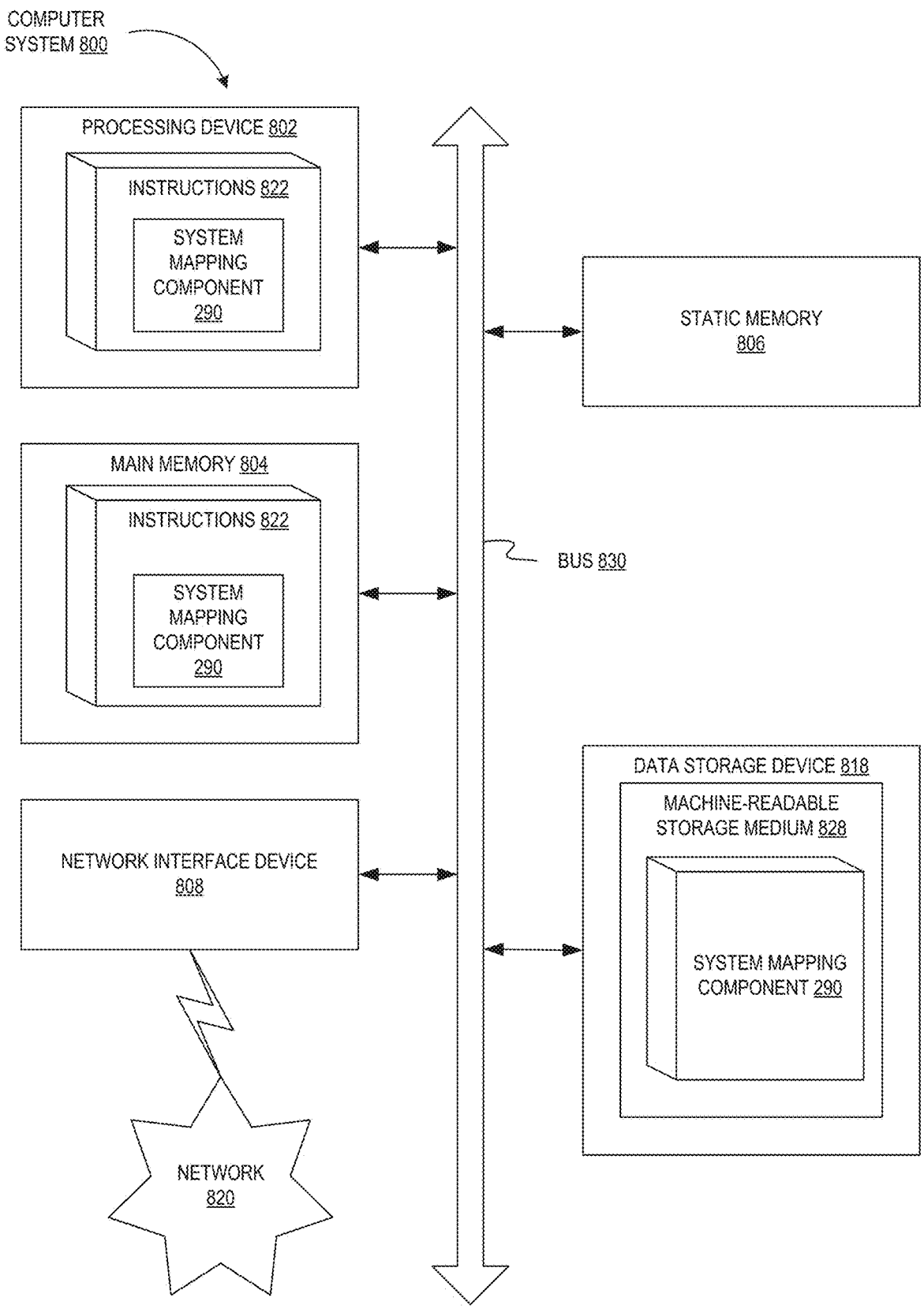
FIG. 8 is a block diagram illustrating an example computer system, in accordance with one implementation of the present disclosure.

FIG. 8 is a block diagram illustrating an example computer system, in accordance with one implementation of the present disclosure. FIG. 8 illustrates a diagrammatic representation of a machine in the example form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a server, such as network monitor entity 102 running system mapping component 290 to generate network system maps, as described herein.

The exemplary computer system 800 includes a processing device 802, a main memory 804 (e.g., read-only memory (ROM), flash memory, dynamic random access memory (DRAM), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection or coupling between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute system mapping component 290, for performing the operations and steps discussed herein.

The data storage device 818 may include a machine-readable storage medium 828, on which is stored one or more set of instructions 822 (e.g., software) embodying any one or more of the methodologies of operations described herein, including instructions to cause the processing device 802 to execute system mapping component 290. The instructions 822 may also reside, completely or at least partially, within the main memory 804 or within the processing device 802 during execution thereof by the computer system 800; the main memory 804 and the processing device 802 also constituting machine-readable storage media. The instructions 822 may further be transmitted or received over a network 820 via the network interface device 808.

The machine-readable storage medium 828 may also be used to store instructions to perform a method for generating network system maps, as described herein. The machine-readable storage medium 828 may also be used to store instructions to perform a method for updating network system maps and updating libraries, as described herein. While the machine-readable storage medium 828 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

When an action, function, operation, etc., is described herein as being performed automatically, this may indicate that the action, function, operation, etc., may be performed without requiring human or user input, invocation, or interaction.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
  accessing, by a network monitoring device coupled to a network, network traffic from the network, wherein the network traffic is transmitted by a plurality of devices communicatively coupled to the network;
  parsing the network traffic to obtain metadata of the network traffic, wherein the metadata comprises properties associated with the plurality of devices and properties of the network traffic;
  identifying a first device of the plurality of devices from the network traffic;
  classifying the first device based on the properties associated with the first device determined from the network traffic;
  identifying a first network system of a plurality of network systems based on the metadata of the network traffic and the classification of the first device, wherein the first network system comprises an independent subset of the plurality of devices including the first device that operate together to provide a first network based functionality for one or more other devices via the network, and wherein the first network system is identified by a network system identifier, and wherein each device of the first network system is associated with at least one of a network system type or the network system identifier corresponding to the first network system;
  determining a flow of packets of the network traffic to or from the first device;
  identifying one or more devices of the plurality of devices that are in communication with the first device based on the flow of packets of the network traffic to or from the first device;
  generating a network system map for the first network system based on the metadata, the flow of packets of the network traffic, and the one or more devices in communication with the first device, wherein the network system map indicates each of the subset of the plurality of devices and couplings between each device of the subset of the plurality of devices of the first network system;
  performing a payload analysis of the network traffic to identify additional properties associated with the plurality of devices and the network traffic; and
  updating the network system map for the first network system based on the additional properties associated with the plurality of devices and the network traffic determined by the payload analysis.

2. The method of claim 1, wherein identifying the first network system comprises:
  selecting the first device from the plurality of devices, based on one or more of the metadata of the network traffic and additional data, wherein the first network system comprises the first device; and
  determining the network system type for the first network system, the network system identifier for the first network system, and a network system role for the first device based on the metadata of the network traffic, wherein the network system role indicates a role of the first device within the first network system.

3. The method of claim 2, wherein the network system map is generated based on the network system type for the first network system, the network system identifier for the first network system, and the network system role.

4. The method of claim 2, wherein identifying the first network system further comprises:
selecting additional devices at different coupling levels to the first device, wherein the first network system further comprises the additional devices; and
determining additional network system roles for the additional devices.

5. The method of claim 4, wherein the network system map is generated further based on the additional network system roles for the additional devices.

6. The method of claim 1, wherein the metadata of the network traffic comprises at least one of one or more of headers of the network traffic, footers of the network traffic, one or more protocols of the network traffic, or one or more sizes of the network traffic.

7. The method of claim 1, wherein parsing the network traffic comprises:
determining one or more of a set of times when packets of the network traffic were transmitted and a set of sizes of the packets of the network traffic.

8. The method of claim 1, wherein the network system map is initially generated without performing deep packet inspection on the network traffic or without parsing payloads of the network traffic.

9. The method of claim 8, wherein the payload analysis comprises deep packet inspection of the network traffic, and wherein
updating the network system map is based on the deep packet inspection of the network traffic.

10. The method of claim 1, wherein:
the network system map is generated further based on a set of libraries; and
the set of libraries comprises data for classifying different devices of the network and for classifying different network systems of the plurality of network systems.

11. The method of claim 1, further comprising:
obtaining additional network traffic from the network, wherein the additional network traffic is transmitted by the plurality of devices communicatively coupled to the network;
parsing the additional network traffic to obtain additional metadata of the additional network traffic; and
updating the network system map for the first network system.

12. A system, comprising:
a memory; and
a processing device, operatively coupled to the memory, to:
access network traffic from a network, wherein the network traffic is transmitted by a plurality of devices communicatively coupled to the network;
parse the network traffic to obtain metadata of the network traffic, wherein the metadata comprises properties associated with the plurality of devices and properties of the network traffic;
identify a first device of the plurality of devices from the network traffic;
classify the first device based on the properties associated with the first device determined from the network traffic;
identify a first network system of a plurality of network systems based on the metadata of the network traffic and the classification of the first device, wherein the first network system comprises an independent subset of the plurality of devices including the first device that operate together to provide a network based functionality for one or more other devices via the network, and wherein the first network system is identified by a network system identifier, and wherein each device of the first network system is associated with at least one of a network system type or the network system identifier corresponding to the first network system;
determine a flow of packets of the network traffic to or from the first device;
identify one or more devices of the plurality of devices that are in communication with the first device based on the flow of packets of the network traffic to or from the first device;
generate a network system map for the first network system based on the metadata, the flow of packets of the network traffic, and the one or more devices in communication with the first device, wherein the network system map indicates each of the subset of the plurality of devices and couplings between each device of the subset of the plurality of devices of the first network system;
perform a payload analysis of the network traffic to identify additional properties associated with the plurality of devices and the network traffic; and
update the network system map for the first network system based on the additional properties associated with the plurality of devices and the network traffic determined by the payload analysis.

13. The system of claim 12, wherein to identify the first network system the processing device is further to:
select the first device from the plurality of devices, based on one or more of the metadata of the network traffic and additional data, wherein the first network system comprises the first device; and
determine the network system type for the first network system, the network system identifier for the first network system, and a network system role for the first device based on the metadata of the network traffic, wherein the network system role indicates a role of the first device within the first network system.

14. The system of claim 13, wherein the network system map is generated based on the network system type for the first network system, the network system identifier for the first network system, and the network system role.

15. The system of claim 13, wherein to identify the first network system the processing device is further to:
select additional devices at different coupling levels to the first device, wherein the first network system further comprises the additional devices; and
determine additional network system roles for the additional devices.

16. The system of claim 14, wherein the network system map is generated further based on the additional network system roles for the additional devices.

17. The system of claim 12, wherein the metadata of the network traffic comprises at least one of one or more of headers of the network traffic, footers of the network traffic, one or more protocols of the network traffic, or one or more sizes of the network traffic.

18. The system of claim 12, wherein to parse the network traffic the processing device is further to:

determine one or more of a set of times when packets of the network traffic were transmitted and a set of sizes of the packets of the network traffic.

19. The system of claim 12, wherein the network system map is initially generated without performing deep packet inspection on the network traffic or without parsing payloads of the network traffic.

20. A non-transitory computer readable medium having instructions encoded thereon that, when executed by a processing device, cause the processing device to:
   access network traffic from a network, wherein the network traffic is transmitted by a plurality of devices communicatively coupled to the network;
   parse the network traffic to obtain metadata of the network traffic, wherein the metadata comprises properties associated with the plurality of devices and properties of the network traffic;
   identify a first device of the plurality of devices from the network traffic;
   classify the first device based on the properties associated with the first device determined from the network traffic;
   identify a first network system of a plurality of network systems based on the metadata of the network traffic and the classification of the first device, wherein the first network system comprises an independent subset of the plurality of devices including the first device that operate together to provide a network based functionality for one or more other device via the network, and wherein the first network system is identified by a network system identifier, and wherein each device of the first network system is associated with at least one of a network system type or the network system identifier corresponding to the first network system;
   determine a flow of packets of the network traffic to or from the first device;
   identify one or more devices of the plurality of devices that are in communication with the first device based on the flow of packets of the network traffic to or from the first device;
   generate a network system map for the first network system based on the metadata associated with the plurality of devices of the network, the flow of packets of the network traffic, and the one or more devices in communication with the first device, wherein the network system map indicates each of the subset of the plurality of devices and couplings between each device of the subset of the plurality of devices of the first network system;
   perform a payload analysis of the network traffic to identify additional properties associated with the plurality of devices and the network traffic; and
   update the network system map for the first network system based on the additional properties associated with the plurality of devices and the network traffic determined by the payload analysis.

* * * * *